United States Patent
Hughes et al.

(10) Patent No.: US 8,210,294 B2
(45) Date of Patent: Jul. 3, 2012

(54) METHOD AND SYSTEM FOR SHUTTING DOWN AN ENGINE IN A HYBRID VEHICLE

(75) Inventors: Douglas A. Hughes, Wixom, MI (US); Matthew R. Busdiecker, Royal Oak, MI (US)

(73) Assignee: Eaton Corporation, Cleveland, OH (US)

( * ) Notice: Subject to any disclaimer, the term of this patent is extended or adjusted under 35 U.S.C. 154(b) by 1087 days.

(21) Appl. No.: 11/252,678

(22) Filed: Oct. 18, 2005

(65) Prior Publication Data

US 2007/0084653 A1   Apr. 19, 2007

(51) Int. Cl.
*B60W 10/06* (2006.01)
*B60W 10/08* (2006.01)

(52) U.S. Cl. ........... 180/65.285; 180/65.28; 180/65.265; 180/65.275

(58) Field of Classification Search ................. 180/65.2, 180/65.3; 903/942, 946
See application file for complete search history.

(56) References Cited

U.S. PATENT DOCUMENTS

| | | | | |
|---|---|---|---|---|
| 4,066,941 | A * | 1/1978 | Foster | 388/809 |
| 5,632,238 | A * | 5/1997 | Furukawa et al. | 123/179.3 |
| 5,725,064 | A * | 3/1998 | Ibaraki et al. | 180/65.2 |
| 6,011,373 | A * | 1/2000 | McConnell et al. | 318/560 |
| 6,018,198 | A * | 1/2000 | Tsuzuki et al. | 290/17 |
| 6,192,847 | B1 | 2/2001 | Davis | |
| 6,286,473 | B1 * | 9/2001 | Zaremba | 123/192.1 |
| 6,453,864 | B1 * | 9/2002 | Downs et al. | 123/179.3 |
| 6,603,278 | B2 * | 8/2003 | Oshima et al. | 318/139 |
| 6,834,632 | B2 * | 12/2004 | Kataoka et al. | 123/179.4 |
| 6,947,827 | B2 * | 9/2005 | Fuse et al. | 701/110 |
| 7,059,297 | B2 * | 6/2006 | Kataoka et al. | 123/322 |
| 7,074,157 | B2 * | 7/2006 | Wakashiro et al. | 477/7 |
| 7,217,221 | B2 | 5/2007 | Sah et al. | |
| 7,220,217 | B2 * | 5/2007 | Tamai et al. | 477/183 |
| 7,261,076 | B2 * | 8/2007 | Hoevermann | 123/179.4 |
| 7,263,959 | B2 * | 9/2007 | Kataoka et al. | 123/179.4 |
| 7,292,917 | B2 * | 11/2007 | Kuang et al. | 701/22 |
| 7,434,640 | B2 * | 10/2008 | Hughes | 180/65.3 |
| 7,559,387 | B2 * | 7/2009 | Tamai | 180/65.285 |
| 2004/0107926 | A1 | 6/2004 | Kataoka et al. | |
| 2005/0003925 | A1 * | 1/2005 | Wakashiro et al. | 477/2 |
| 2006/0224282 | A1 * | 10/2006 | Seo et al. | 701/22 |

FOREIGN PATENT DOCUMENTS

| | | |
|---|---|---|
| DE | 19724921 A1 | 12/1998 |
| EP | 1439296 A2 | 7/2004 |
| WO | 2004018246 A1 | 3/2004 |

OTHER PUBLICATIONS

International Search Report and the Written Opinion for Application PCT/IB2006/002914 mailed Mar. 14, 2007.

* cited by examiner

*Primary Examiner* — J. Allen Shriver, II
*Assistant Examiner* — Travis Coolman
(74) *Attorney, Agent, or Firm* — Dykema Gossett PLLC

(57) ABSTRACT

A method is provided for shutting down an internal combustion engine in a hybrid vehicle that includes a motor and a generator operatively connected to an engine crankshaft. The method includes the steps of reducing compression in at least one engine cylinder and operating the motor or generator to influence motion of the engine crankshaft during engine shutdown to attenuate oscillations in and expedite reduction of engine crankshaft speed. A system for shutting down a hybrid vehicle internal combustion engine is also provided.

21 Claims, 5 Drawing Sheets

METHOD AND SYSTEM FOR SHUTTING DOWN AN ENGINE IN A HYBRID VEHICLE

BACKGROUND OF THE INVENTION

1. Field of the Invention

The present invention relates to a hybrid vehicle and to a method and system for shutting down an engine in a hybrid vehicle to improve the noise, vibration and harshness ("NVH") characteristics of the engine shutdown event.

2. Description of the Related Art

The motor vehicle industry is actively working to develop alternative powertrain systems in an effort to improve vehicle fuel economy and reduce the level of pollutants exhausted into the air by conventional powertrain systems equipped with internal combustion engines. Significant development efforts have been directed to electric and fuel-cell vehicles. Unfortunately, these alternative powertrain systems currently suffer from several limitations and, for all practical purposes, are still under development. However, "hybrid" vehicles, which typically include an internal combustion engine and an electric motor and/or generator, offer a compromise between traditional internal combustion engine powered vehicles and full electric powered vehicles.

Hybrid vehicles are generally classified as either series hybrid vehicles or parallel hybrid vehicles. In a series hybrid vehicle, a generator is driven by the mechanical output of an internal combustion engine. The output of the generator may be combined with the output of a vehicle battery to drive an electric motor, which in turn drives the vehicle.

Parallel hybrid vehicles, on the other hand, are usually driven directly by the mechanical output of the internal combustion engine. However, when the vehicle must be accelerated or decelerated at a rate that cannot be accomplished by the internal combustion engine alone, the electric motor-generator, which is mechanically connected to the internal combustion engine, operates as an electric motor (on acceleration) or as an electric generator (on deceleration) to meet the required rate of acceleration or deceleration through the combined output of the internal combustion engine and the electric motor-generator.

In certain hybrid vehicle configurations, the engine is shut down periodically during vehicle operation when power is not required to conserve fuel and reduce emissions. During engine shutdown, the pumping processes within the engine result in torque disturbances and engine crankshaft speed oscillations that adversely effect the smoothness of the engine shutdown event. Noise, vibration and harshness associated with the shutdown event is generally undesirable since it may be perceived by the vehicle occupant.

SUMMARY OF THE INVENTION

A method is provided for shutting down an internal combustion engine in a hybrid vehicle that includes a motor and a generator operatively connected to an engine crankshaft. In an embodiment, the method includes the steps of reducing compression in at least one engine cylinder and operating the motor or generator to influence motion of the engine crankshaft during engine shutdown to attenuate oscillations in and expedite reduction of engine crankshaft speed. A system for shutting down a hybrid vehicle internal combustion engine is also provided.

BRIEF DESCRIPTION OF THE DRAWINGS

Embodiments of the invention will now be described, by way of example, with reference to the accompanying drawings, wherein.

DETAILED DESCRIPTION

Figure 1:
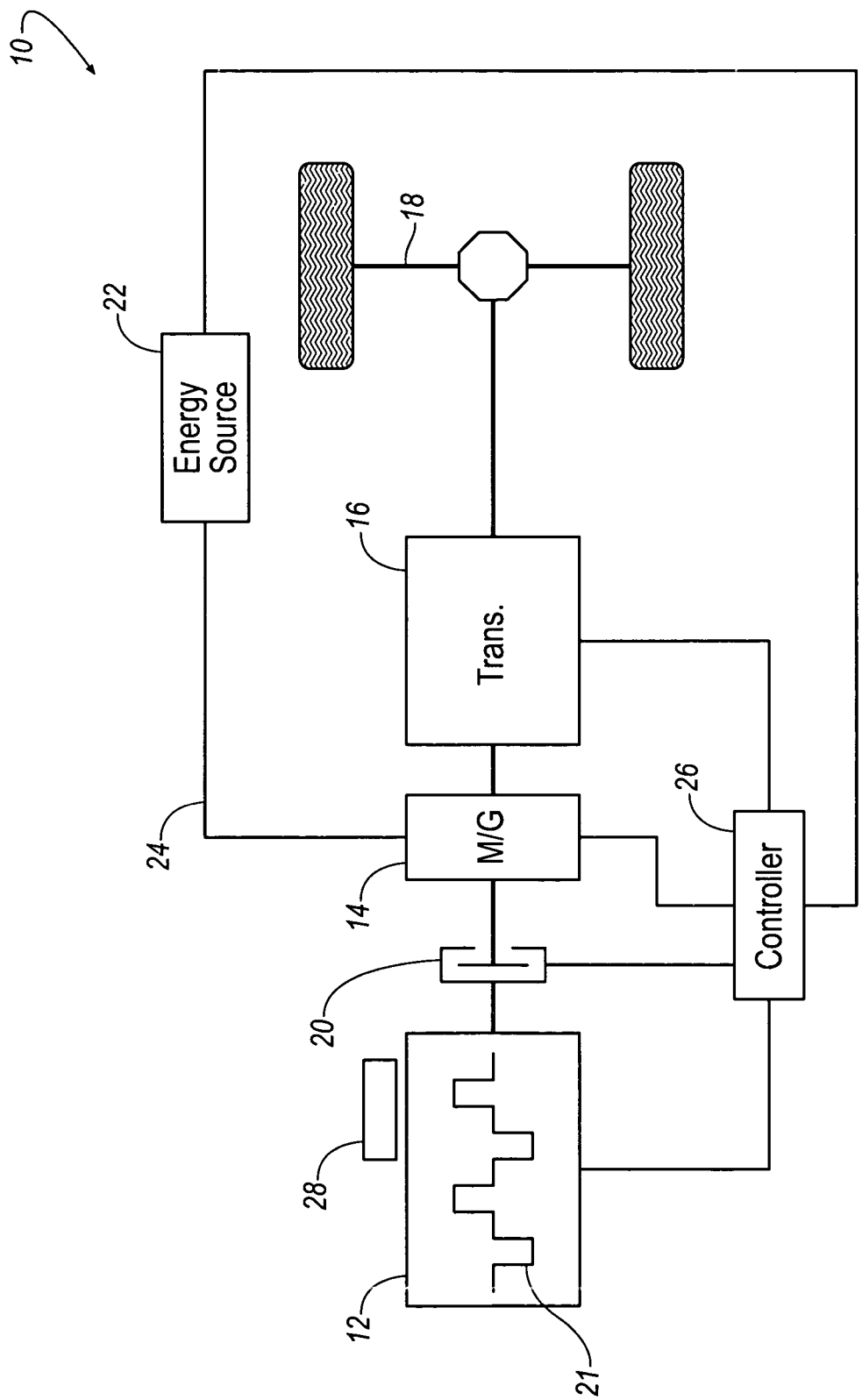
FIG. 1 is a schematic illustration of a hybrid vehicle powertrain including a system for shutting down an internal combustion engine according to an embodiment of the present invention.

Referring to FIG. 1, an exemplary hybrid vehicle powertrain 10 is shown, which utilizes a method and system for shutting down an internal combustion engine according to an embodiment of the present invention. As illustrated in FIG. 1, hybrid powertrain 10 includes an engine 12, such as a diesel or gasoline-fueled internal combustion engine, an electric or hydraulic motor-generator 14, and an engine and/or motor-driven power transmission mechanism 16. In FIG. 1, hybrid powertrain 10 operates as a parallel hybrid powertrain system, permitting motor-generator 14 to drive power transmission mechanism 16 alone or in combination with engine 12 to provide motive power to a vehicle drive-axle 18. An optional clutch 20 may be positioned between engine 12 and motor-generator 14 to selectively couple or uncouple engine 12 from motor-generator 14 and/or power transmission mechanism 16. In this manner, motor-generator 14 is operatively connected to an engine crankshaft 21 and may be selectively operated to influence motion thereof.

The energy required to operate motor-generator 14 is supplied by an energy source 22, including, without limitation, a battery, a bank of batteries or a hydraulic accumulator. As an example, energy source 22 will be described herein below as a battery for storing the electrical energy needed to power an electric motor-generator 14. It will also be appreciated that motor-generator 14 may function as a generator to convert powertrain energy into electrical energy, which may be used to charge energy source 22 and/or power various electrical components in the vehicle.

Operation of hybrid powertrain 10 is controlled by a controller 26, such as a microprocessor-based electronic control unit. Controller 26 may include or be linked to one or more sub-controllers (not shown), such as a battery controller, for controlling operation of one or more individual powertrain components. Controller 26 may also communicate with a vehicle engine controller (not shown), which may also be contained in the same unit. Controller 26 may be linked to one or more vehicle sensors (not shown), such as conventional engine or crankshaft speed sensors, which provide data, such as engine or crankshaft speed, to controller 26 for utilization in controlling motor-generator 14. As described in an embodiment of the invention below, controller 26 may receive signals from the sensors, and based upon the received signals, control operation of motor-generator 14 during engine shutdown to influence motion of crankshaft 21.

In an embodiment, engine 12 includes a compression reducing device 28. Compression reducing device 28 may include; without limitation, an engine brake or hydraulic valve actuation system that controls actuation of an engine valve(s) independent of the crankshaft position. In an embodiment, compression reducing device 28 is mounted on, or within, the engine overhead, and is adapted to change the opening timing of the engine intake and/or exhaust valves to reduce compression in at least one engine cylinder (neither shown). In this manner, the cylinder pressure and, accordingly, the torque applied to engine crankshaft 21 by the compressed cylinder contents, may be selectively reduced. In a particular configuration, compression reducing device 28 is configured to continuously open at least one engine intake valve during engine shutdown.

Figure 2:
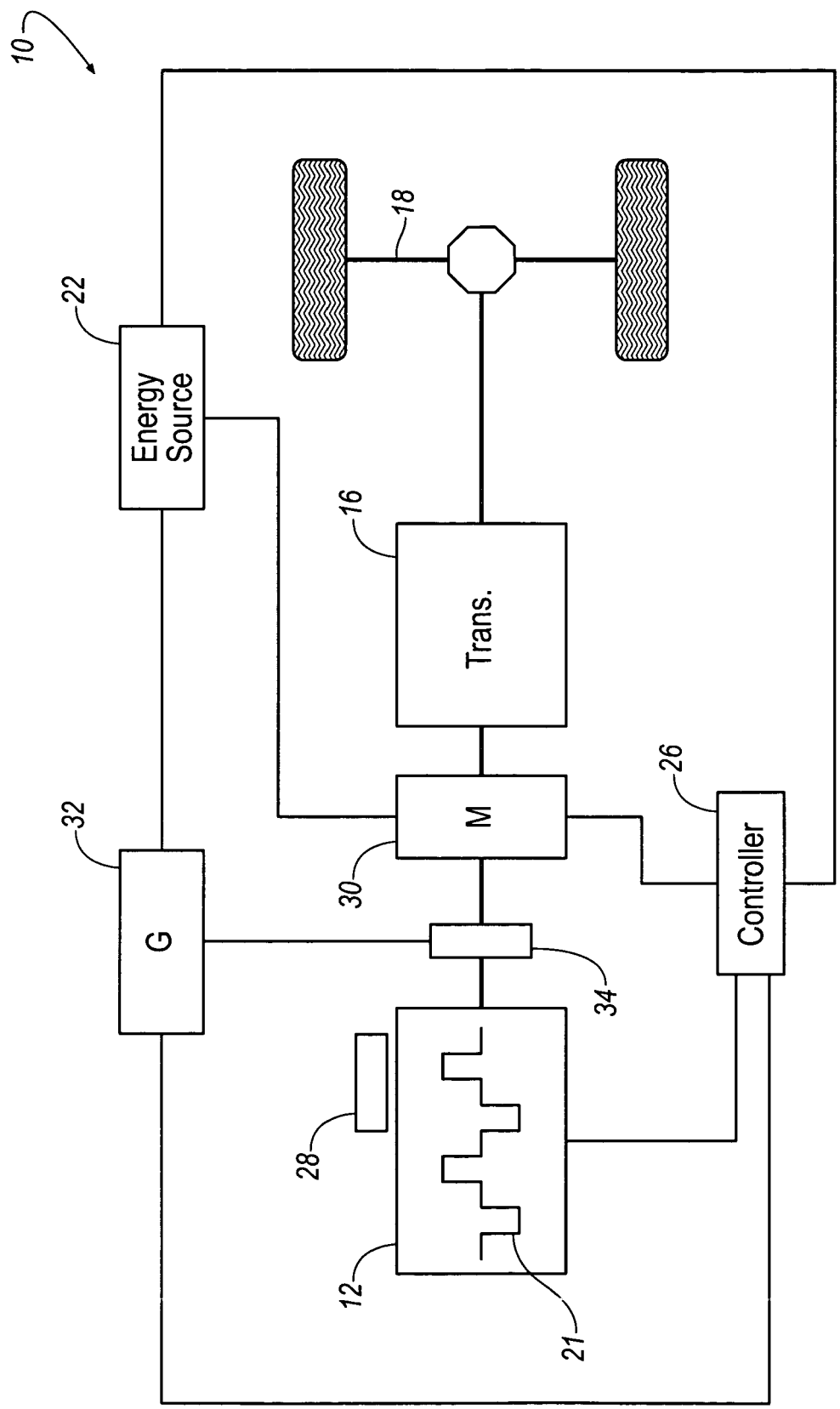
FIG. 2 is a schematic illustration of a hybrid vehicle powertrain including a system for shutting down an internal combustion engine according to another embodiment of the present invention.

The hybrid powertrain system configuration shown in FIG. 1 is provided for reference only and is not intended to limit the scope of the present invention. As shown in FIG. 2, for example, hybrid powertrain 10 may also be configured with a motor 30 that is separate and distinct from a generator 32. Motor 30 and generator 32 may be operatively connected to engine crankshaft 21 by a power splitting device 34, such as a planetary gearset and the like, which permits hybrid powertrain 10 to operate in a serial or parallel manner.

A method and system for shutting down an internal combustion engine 12 in a hybrid vehicle according to an embodiment of the present invention will now be described with reference to FIGS. 3-5. In an embodiment, when a command to shutdown internal combustion engine 12 is received by controller 26, controller 26 is configured to selectively operate compression-reducing device 28 to reduce the compression in at least one cylinder of the engine and, accordingly, to reduce the torque applied to crankshaft 21. For example, compression-reducing device 28 may open at least one engine intake valve during the engine shutdown event, thereby reducing or eliminating the cylinder pressure and corresponding torque applied to rotate crankshaft 21. Controller 26 may operate compression-reducing device 28 to open the intake valves in any number of engine cylinders to achieve the desired engine cylinder decompression. Controller 26 may also be configured to operate compression-reducing device 28 during the entire engine shutdown event or only during some finite portion of the engine shutdown event.

During the engine shutdown event, controller 26 is also configured to operate motor-generator 14, or motor 30 and generator 32 independently when not integrally packaged as shown in FIG. 2, to influence motion of engine crankshaft 21. In an embodiment, motor-generator 14 may be operated to apply a predetermined torque to engine crankshaft 21, or a target torque profile that varies with respect to time, to influence motion of engine crankshaft 21. Torque may be applied to crankshaft 21 by virtue of motor-generator 14 operating as a generator, whereby mechanical energy removed from crankshaft 21 is converted to electrical energy by motor-generator 14 and stored in energy source 22. The torque profile may be substantially synchronized with the engine crankshaft speed during engine shutdown. The predetermined torque or target torque profile may be pre-programmed into controller 26 and referenced during the engine shutdown event to generate a command for operation of motor-generator 14 or may be determined in a closed-loop manner relying on data received from the vehicle sensors.

Figure 3:
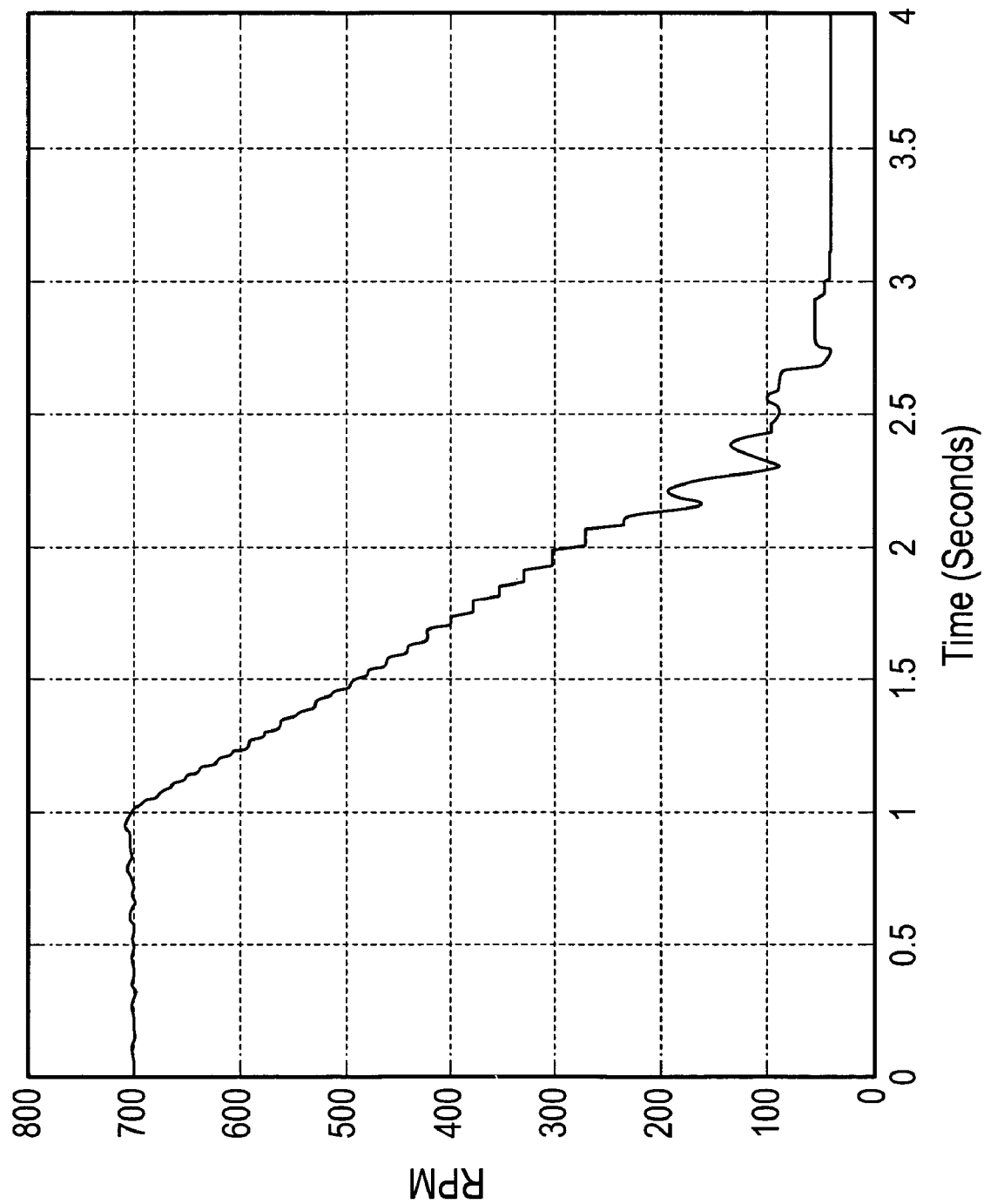
FIG. 3 is a graphical illustration of engine speed during engine shutdown in a prior art powertrain.
Figure 4:
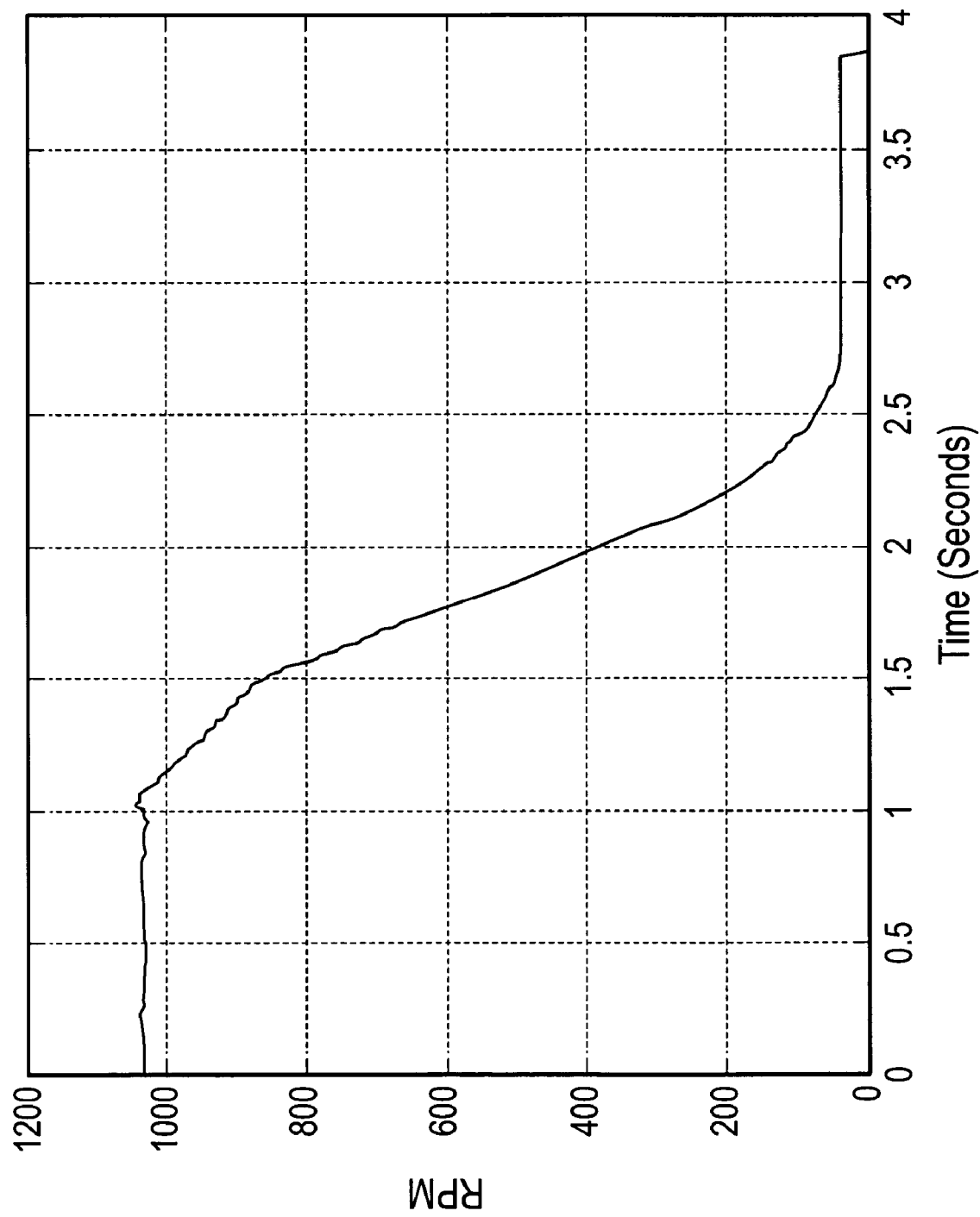
FIG. 4 is a graphical illustration of engine speed during engine shutdown in a hybrid powertrain as provided by an embodiment of the present invention.
Figure 5:
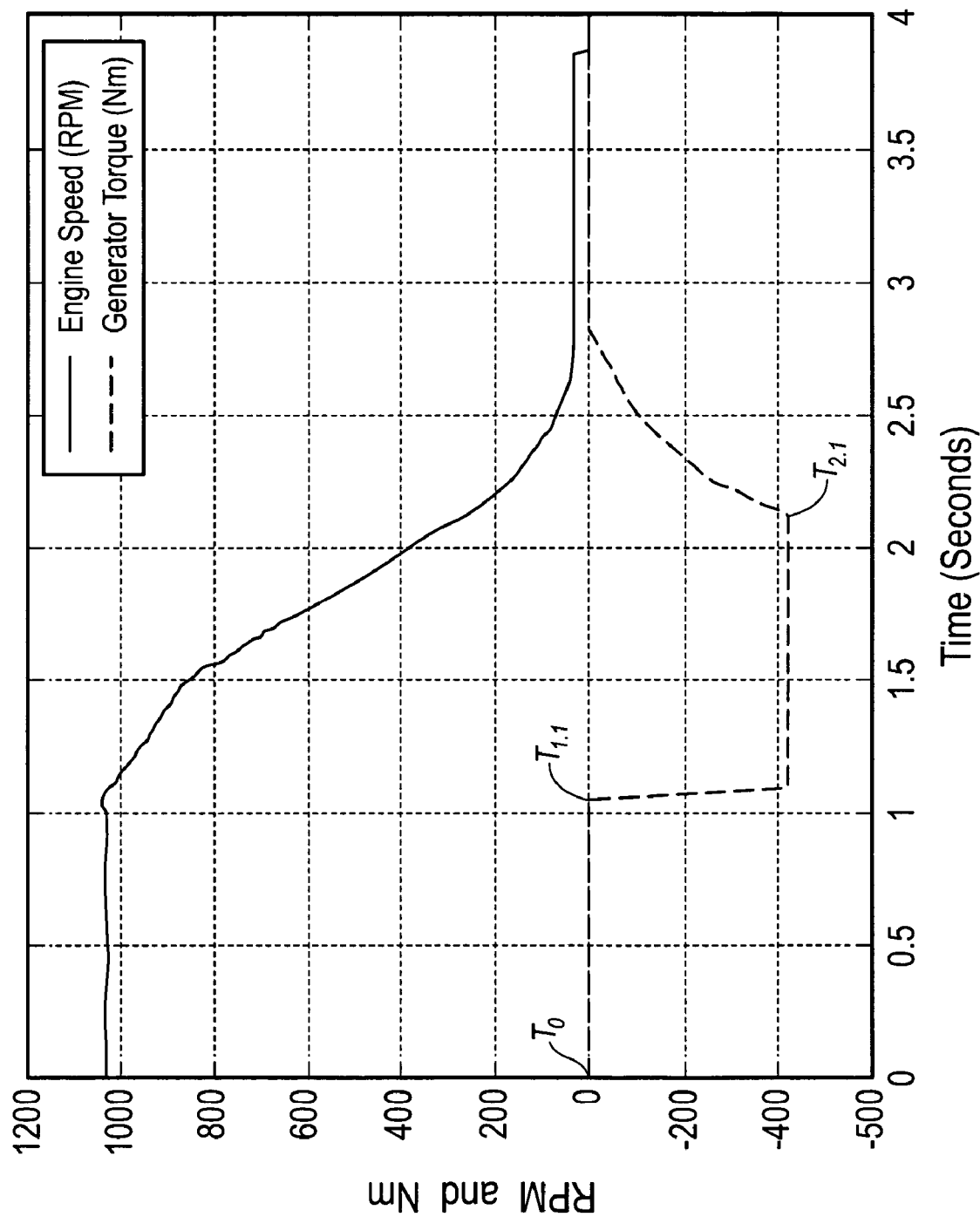
FIG. 5 is a graphical illustration of engine speed and motor-generator torque during engine shutdown in a hybrid powertrain as provided by an embodiment of the present invention.

Operation of the present invention will be further appreciated with reference to FIGS. 3-5. FIG. 3 illustrates engine speed during engine shutdown in a prior art powertrain. Oscillations in engine speed that contribute to noise, vibration and harshness in the powertrain are visible in the engine speed graph, particularly near the end of the engine shutdown event as the engine crankshaft slows to a stop. By contrast, FIG. 4 graphically illustrates engine speed during engine shutdown according to an embodiment of the present invention. By reducing compression in at least one engine cylinder and operating motor-generator 14 to influence motion of engine crankshaft 21 during engine shutdown, the oscillations visible in FIG. 3 are attenuated and crankshaft speed reduction is expedited.

FIG. 5 overlays motor-generator torque with the engine speed graph of FIG. 4. In the embodiment illustrated in FIG. 5, controller 26 determines the required torque in a closed-loop manner based on data received from vehicle sensors, such as the engine or crankshaft speed sensors, with the objective of slowing the motor-generator speed to zero revolutions per minute ("RPM"). At $T_0$, engine is operating at approximately 1030 RPM and motor-generator 14 is applying no torque to crankshaft 21. At approximately $T_{1.1}$, engine 12 is commanded off and controller 26 operates motor-generator 14 as a generator to apply its maximum torque (e.g., about 420 Nm) to remove energy from crankshaft 21. The mechanical energy removed from crankshaft 21 is converted to electrical energy by motor-generator 14 and stored in energy source 22, thereby increasing the energy source's state-of-charge. At approximately $T_{2.1}$, controller 26 operates motor-generator 14 to apply torque generally proportional to engine crankshaft speed. Gradually reducing the torque applied to crankshaft 21 inhibits motor-generator 14 from applying such as significant amount of torque that engine 12 is cranked backwards after coming to rest.

Alternatively, motor-generator 14 may be operated at a predetermined speed or according to a target speed profile that varies with respect to time during engine shutdown. In an embodiment, for example, motor-generator 14 may be commanded to operate at zero revolutions per minute so that motor-generator 14 removes energy from crankshaft 21 during shutdown. In another embodiment, controller 26 may be configured to alternatively operate motor-generator 14 as a motor and a generator, or motor 30 and generator 32 in their individual capacity, to actively dampen oscillations in engine crankshaft speed during engine shutdown. In this manner, positive torque may be applied to crankshaft 21 by virtue of motor-generator 14 operating as a motor and negative torque may be applied crankshaft 21 by virtue of motor-generator 14 operating as a generator.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method for shutting down an internal combustion engine in a hybrid vehicle that includes at least one of a motor and a generator operatively connected to an engine crankshaft, the method comprising the steps of:

initiating a shutdown of the engine;

reducing compression in at least one engine cylinder; and selectively operating only the at least one of the motor and the generator to primarily influence motion of the engine crankshaft during engine shutdown to attenuate oscillations in and expedite reduction of engine crankshaft speed, wherein the selectively operating step includes selectively operating the motor or the generator to apply a predetermined torque to the engine crankshaft or a target torque profile that varies with respect to time, wherein the duration of the engine shutdown is greater than 2 seconds; and wherein the reducing step includes continuously opening at least one engine valve during the entire duration of the engine shutdown.

2. The method of claim 1, wherein the selectively operating step includes operating the motor or the generator at a predetermined speed or according to a target speed profile that varies with respect to time.

3. The method of claim 2, wherein the predetermined speed is approximately zero revolutions per minute.

4. The method of claim 3, wherein the at least one of a motor and a generator includes a motor and a generator, wherein the selectively operating step includes alternatively operating the motor and the generator to actively dampen oscillations in engine crankshaft speed during the engine shutdown.

5. The method of claim 1, wherein the at least one of the motor and the generator convert engine crankshaft energy into electrical energy to charge an energy source or power electrical components of said vehicle.

6. The method of claim 1, wherein the torque profile is substantially synchronized with the engine crankshaft speed during engine shutdown.

7. The method of claim 1, wherein a position of the engine crankshaft after engine shutdown is not predetermined.

8. The method of claim 1, wherein the reducing step further includes reducing compression in at least one cylinder until compression is substantially eliminated.

9. The method of claim 1, including both a motor and a generator, wherein the motor and the generator are integrally packaged as a motor-generator.

10. The method of claim 1, wherein the at least one of a motor and a generator comprises a motor, and the hybrid vehicle further includes a clutch between the engine and the motor, and the method further includes the step of activating the clutch to selectively connect the motor to the engine prior to the selectively operating step.

11. A system for shutting down a hybrid vehicle internal combustion engine that includes at least one engine cylinder and a crankshaft, the system comprising:
an engine cylinder compression-reducing device;
at least one of a motor and a generator operatively connected to the engine crankshaft and adapted to primarily influence motion of the engine crankshaft during engine shutdown; and
a controller configured to selectively operate the compression-reducing device to reduce compression in at least one engine cylinder and to selectively operate the motor or the generator to influence motion of the engine crankshaft during engine shutdown, wherein the controller is configured to operate the motor or the generator to apply a predetermined torque to the engine crankshaft or a target torque profile that varies with respect to time, wherein the duration of the engine shutdown is greater than 2 seconds, and wherein the controller is configured to continuously open at least one engine valve during the entire duration of the engine shutdown.

12. The system of claim 11, wherein the controller is configured to operate the motor or the generator at a predetermined speed or according to a target speed profile that varies with respect to time.

13. The system of claim 12, wherein the predetermined speed is approximately zero revolutions per minute.

14. The system of claim 11, wherein the at least one of the motor and the generator are configured to selectively convert engine crankshaft energy into electrical energy to charge an energy source or power electrical components of a hybrid vehicle including said system installed therein.

15. The system of claim 11, wherein the controller is configured to reduce compression in at least one cylinder until compression is substantially eliminated.

16. The system of claim 11, wherein the motor and the generator are integrally packaged as a motor-generator.

17. The system of claim 11, wherein the controller is configured to selectively operate the motor or the generator in a closed-loop manner.

18. The system of claim 11, wherein the torque load profile is substantially synchronized with the engine crankshaft speed during the engine shutdown.

19. The system of claim 8, wherein the at least one of a motor and a generator includes a motor and a generator, and the controller is configured to alternatively operate the motor and the generator to actively dampen oscillations in engine crankshaft speed during engine shutdown.

20. The system of claim 11, wherein the further includes a clutch between the engine and the motor, and wherein the controller is configured to activate the clutch to selectively connect the motor to the engine prior to the operating of motor.

21. The system of claim 11, wherein a position of the engine crankshaft after engine shutdown is not predetermined.

* * * * *

UNITED STATES PATENT AND TRADEMARK OFFICE
CERTIFICATE OF CORRECTION

PATENT NO. : 8,210,294 B2
APPLICATION NO. : 11/252678
DATED : July 3, 2012
INVENTOR(S) : Douglas A. Hughes and Matthew R. Busdiecker It is certified that error appears in the above-identified patent and that said Letters Patent is hereby corrected as shown below:

Column 6, Line 39, (Claim 19, line 1), "claim 8" should be -- claim 11 --

Column 6, Line 44, (Claim 20, line 1) after "wherein the", insert
-- at least one of a motor and a generator comprises a motor and the system --

Signed and Sealed this
Fourteenth Day of August, 2012

David J. Kappos
*Director of the United States Patent and Trademark Office*